US008305366B2

(12) United States Patent
Huang

(10) Patent No.: US 8,305,366 B2
(45) Date of Patent: Nov. 6, 2012

(54) FLAT PANEL DISPLAY HAVING A MULTI-CHANNEL DATA TRANSFER INTERFACE AND IMAGE TRANSFER METHOD THEREOF

(75) Inventor: Chi-Ting Huang, Tainan County (TW)

(73) Assignee: Chimei Innolux Corporation, Maio-Li County (TW)

( * ) Notice: Subject to any disclaimer, the term of this patent is extended or adjusted under 35 U.S.C. 154(b) by 1118 days.

(21) Appl. No.: 11/556,764

(22) Filed: Nov. 6, 2006

(65) Prior Publication Data

US 2007/0115272 A1 May 24, 2007

(30) Foreign Application Priority Data

Nov. 22, 2005 (TW) ................................ 94140998 A

(51) Int. Cl.
*G06F 3/038* (2006.01)

(52) U.S. Cl. .......................................... 345/204; 345/98

(58) Field of Classification Search ............ 345/87–104, 345/204–215, 690–699
See application file for complete search history.

(56) References Cited

U.S. PATENT DOCUMENTS

| | | | | |
|---|---|---|---|---|
| 5,400,051 | A * | 3/1995 | Krueger, Jr. | 345/667 |
| 5,874,937 | A * | 2/1999 | Kesatoshi | 345/428 |
| 6,490,058 | B1 * | 12/2002 | Takabatake et al. | 358/442 |
| 6,611,249 | B1 * | 8/2003 | Evanicky et al. | 345/102 |
| 6,784,861 | B2 * | 8/2004 | Okada | 345/87 |
| 6,809,716 | B1 * | 10/2004 | Kim | 345/98 |
| 6,853,387 | B2 * | 2/2005 | Evanicky et al. | 345/690 |
| 6,999,056 | B1 * | 2/2006 | Kim et al. | 345/99 |
| 7,193,597 | B2 * | 3/2007 | Sunohara | 345/98 |
| 7,209,134 | B2 * | 4/2007 | Chun et al. | 345/213 |
| 7,511,726 | B2 * | 3/2009 | Kim et al. | 345/699 |
| 7,525,514 | B2 * | 4/2009 | Ohno | 345/60 |
| 7,724,271 | B2 * | 5/2010 | Ha et al. | 345/698 |
| 2002/0021273 | A1 * | 2/2002 | Lee | 345/88 |
| 2004/0036708 | A1 * | 2/2004 | Evanicky et al. | 345/691 |
| 2004/0051705 | A1 * | 3/2004 | Lee | 345/204 |
| 2004/0177208 | A1 * | 9/2004 | Merritt et al. | 710/305 |
| 2004/0217951 | A1 * | 11/2004 | An | 345/204 |
| 2005/0052440 | A1 * | 3/2005 | Kim et al. | 345/204 |
| 2005/0253827 | A1 * | 11/2005 | Hung et al. | 345/204 |
| 2006/0012616 | A1 * | 1/2006 | Paek | 345/698 |
| 2006/0256102 | A1 * | 11/2006 | Swan | 345/213 |
| 2006/0274162 | A1 * | 12/2006 | Fujishiro | 348/229.1 |
| 2006/0279523 | A1 * | 12/2006 | Nitta et al. | 345/102 |
| 2007/0046596 | A1 * | 3/2007 | Sakakibara et al. | 345/87 |

* cited by examiner

*Primary Examiner* — Amare Mengistu
*Assistant Examiner* — Gene W Lee
(74) *Attorney, Agent, or Firm* — Lowe, Hauptman, Ham & Berner, LLP

(57) ABSTRACT

A flat panel display includes a scaler, a first transmitter, a second transmitter, a first receiver, a second receiver, a compensated driving unit, a timing controller, a data driver, a scan driver and a panel. The scaler generates first and second adjusted image data according to an image signal, and outputs the first and second adjusted image data to the first and second receivers through the first and second transmitters, respectively. The compensated driving unit outputs compensated driving data according to the first and second adjusted image data. The timing controller receives the compensated driving data, and outputs the compensated driving data to the data driver and a scan-starting signal to the scan driver according to timing so as to control each row of pixels on the panel sequentially. The data driver receives the compensated driving data and then outputs a driving voltage to each row of pixels.

24 Claims, 4 Drawing Sheets

FLAT PANEL DISPLAY HAVING A MULTI-CHANNEL DATA TRANSFER INTERFACE AND IMAGE TRANSFER METHOD THEREOF

This application claims the benefit of Taiwan application Serial No. 94140998, filed Nov. 22, 2005, the subject matter of which is incorporated herein by reference.

BACKGROUND OF THE INVENTION

1. Field of the Invention

The invention relates in general to a flat panel display and an image transfer method thereof, and more particularly to a flat panel display having a multi-channel data transfer interface and an image transfer method thereof.

2. Description of the Related Art

Since the Austrian botanist F. Reinitzer discovered liquid crystals in 1888 A.D., liquid crystals have been gradually gained popularity and are now widely used in products such as digital cameras, computer screens, televisions and the like, in the human daily life. Because the response speed of the liquid crystal molecule is relatively slow, various compensation technological methods are disclosed to compensate for a flat panel display.

FIG. 1 is a block diagram schematically depicting a conventional flat panel display 10. Referring to FIG. 1, the conventional flat panel display 10 includes an image processing circuit 110 and a display module 120. The image processing circuit 110 includes a decoder 112, a scaler 114, a first memory controller 116, a first memory 117 and a transmitter 118. The decoder 112 is electrically connected to the scaler 114. The scaler 114 is electrically connected to the transmitter 11 8 and the first memory controller 116. The first memory controller 116 is electrically connected to the first memory 117.

The display module 120 includes an image driving circuit 130, a second memory 140, a data driver 150, a panel 160 and a scan driver 170. The image driving circuit 130 includes a second memory controller 132, a receiver 134, a compensated driving unit 138 and a timing controller 136. The receiver 134 is electrically connected to the second memory controller 132 and the compensated driving unit 138. The second memory controller 132 is electrically connected to the second memory 140 and the compensated driving unit 138. The compensated driving unit 138 is electrically connected to the timing controller 136. The timing controller 136 is electrically connected to the scan driver 170 and the data driver 150. The panel 160 is electrically connected to the data driver 150 and the scan driver 170.

A data transfer interface, such as a LVDS (Low Voltage Differential Signaling) interface, is disposed between the receiver 134 of the display module 120 and the transmitter 118 of the image processing circuit 110. The image processing circuit 110 transfers frames to the display module 120 through the LVDS interface. In detail, the decoder 112 receives an external image signal through the S terminal or AV terminal, and decodes the external image signal into image data D. The scaler 114 sequentially generates image data of multiple frames according to the image data D. When the scaler 114 generates image data F(n−1) of a $(n-1)^{th}$ frame, the first memory controller 116 stores the image data F(n−1) of the $(n-1)^{th}$ frame into the first memory 117, and the transmitter 118 transfers the image data F(n−1) of the $(n-1)^{th}$ frame to the receiver 134. The second memory controller 132 also stores the image data F(n−1) of the $(n-1)^{th}$ frame into the second memory 140.

Thereafter, when the scaler 114 generates image data of a $n^{th}$ frame, the first memory controller 116 stores the image data F(n) of the $n^{th}$ frame into the first memory 117, and the transmitter 118 transfers the image data F(n) of the $n^{th}$ frame to the receiver 134.

The compensated driving unit 138 receives the previous image data F(n−1) of the previous $(n-1)^{th}$ frame of the second memory 140 from the second memory controller 132, receives the image data F(n) of the current $n^{th}$ frame from the receiver 134, and thus outputs compensated driving data C to the timing controller 136. The timing controller 136 outputs the compensated driving data C to the data driver 150 and a scan-starting signal S to the scan driver 170 according to timing. The data driver 150 receives the compensated driving data C and thus outputs a driving voltage CV to the panel 160, while the scan driver 170 receives the scan-starting signal S to sequentially control each row of pixels on the panel 160.

However, in order to induce the compensated driving unit 138 produce a suitable over-driving control signal according to the previous frame and the current frame, the flat panel display 10 must have the second memory 140 disposed in the display module 120 to store the image data of the previous frame, as well as a second memory controller 130 disposed in the image driving circuit 130 to control data access of the second memory 140. Disposing the second memory 140 in the display module 120 not only increases the manufacturing cost but also enlarges an area of a printed circuit board in the display module 120. In addition, disposing the second memory controller 130 in the image driving circuit 130 requires a greater number of pins in the image driving circuit 130, and the package casing of the image driving circuit 130 cannot be effectively reduced.

SUMMARY OF THE INVENTION

It is therefore an object of the invention to provide a flat panel display having a multi-channel data transfer interface and an image transfer method thereof.

One aspect of the invention is accordingly directed to providing a flat panel display including an image processing circuit and a display module. In at least one instance, the image processing circuit includes a decoder, a scaler, a memory module, a first transmitter and a second transmitter. The decoder receives an image signal and decodes the image signal into first image data and second image data for output. The scaler generates first adjusted image data and second adjusted image data according to the first image data and the second image data. The memory module stores the first adjusted image data and the second adjusted image data. The first transmitter transfers the first adjusted image data while the second transmitter transfers the second adjusted image data.

The display module includes a first receiver, a second receiver, a compensated driving unit, a timing controller, a data driver, a scan driver and a panel. The first receiver receives the first adjusted image data while the second receiver receives the second adjusted image data. The compensated driving unit outputs compensated driving data according to the first adjusted image data and the second adjusted image data. The timing controller outputs the compensated driving data and a scan-starting signal according to timing. The data driver receives the compensated driving data and thus outputs a driving voltage to the panel. The scan driver receives the scan-starting signal to sequentially control each row of pixels on the panel.

Another aspect of the invention is directed to providing a display module including a panel, a first receiver, a second receiver, a compensated driving unit, a timing controller, a data driver and a scan driver. The panel has pixels. The first receiver receives first adjusted image data and the second receiver receives second adjusted image data. The compensated driving unit outputs compensated driving data according to the first adjusted image data and the second adjusted image data. The timing controller receives the compensated driving data and sequentially outputs the compensated driving data and a scan-starting signal. The data driver receives the compensated driving data and thus outputs a driving voltage to the panel. The scan driver receives the scan-starting signal to sequentially control each pixel on the panel.

A further aspect of the invention is directed to providing an image transfer method used in a flat panel display. The flat panel display includes an image processing circuit and a display module. The image processing circuit includes a memory module while the display module includes a panel. The image transfer method includes the following steps. First, the method inputs an image signal to the image processing circuit and decodes the image signal into first image data and second image data for output. Next, the method generates first adjusted image data and second adjusted image data according to the first image data and the second image data, and stores the first adjusted image data and the second adjusted image data into the memory module. Then, the method transfers the first adjusted image data and the second adjusted image data to a first receiver and a second receiver of the display module through a first transmitter and a second transmitter of the image processing circuit, respectively. The method outputs compensated driving data according to the first adjusted image data and the second adjusted image data, and outputs the compensated driving data and a scan-starting signal according to timing. Finally, the method outputs the compensated driving data and the scan-starting signal to drive the panel.

Yet another aspect of the invention is directed to providing a flat panel display including an image processing circuit and a display module. The image processing circuit receives an image signal and decodes the image signal into first image data and second image data for output.

In this instance, the display module includes a panel, a data driver, a scan driver and an image driving circuit. The panel has pixels. The data driver transfers pixel data to the pixels on the panel. The scan driver switches each pixel on the panel. The image driving circuit receives the first image data and the second image data, and outputs the pixel data and a control signal to control the data driver and the scan driver according to the first image data and the second image data.

Other aspects, features, and advantages of the invention will become apparent from the following detailed description of the preferred but non-limiting embodiments. The following description is made with reference to the accompanying drawings.

DETAILED DESCRIPTION OF THE EXEMPLARY EMBODIMENTS

In order to improve the frame quality of a flat panel display, a compensated driving unit of the flat panel display has to compensate for the flat panel display according to a previous frame and a current frame such that the flat panel display may have better image quality. Each of the following embodiments includes multiple transmitters in an image processing circuit and multiple receivers in a display module so as to transfer the previous frame and the current frame, respectively. Thus, the flat panel display does not need any build-in memory and memory controller in the display module, and the manufacturing cost of the flat panel display can be reduced to enhance the product competitiveness thereof.

First Embodiment

Figure 1:
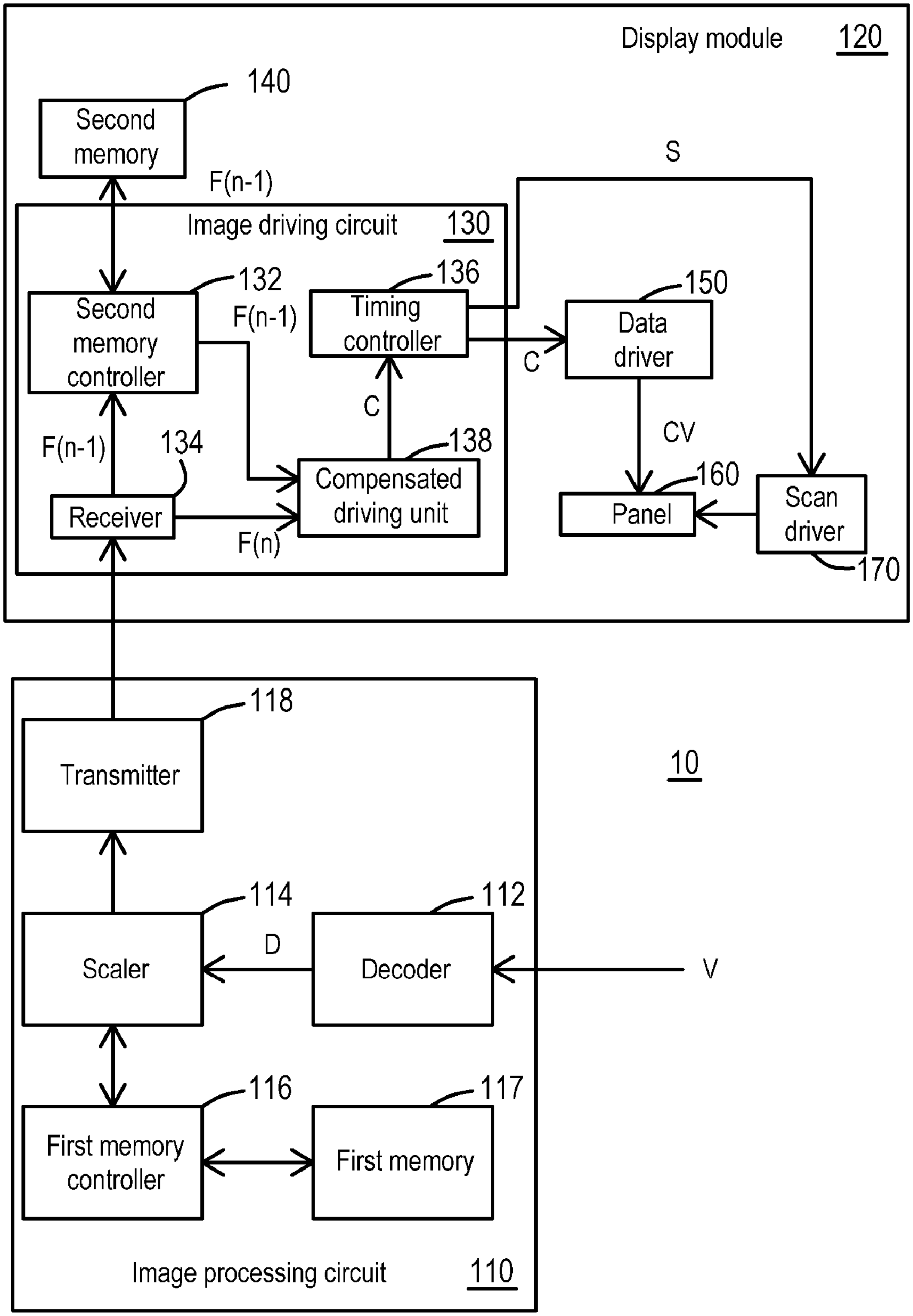
FIG. 1 (PRIOR ART)
FIG. 1 (Prior Art) is a block diagram schematically depicting a conventional flat panel display.
Figure 2:
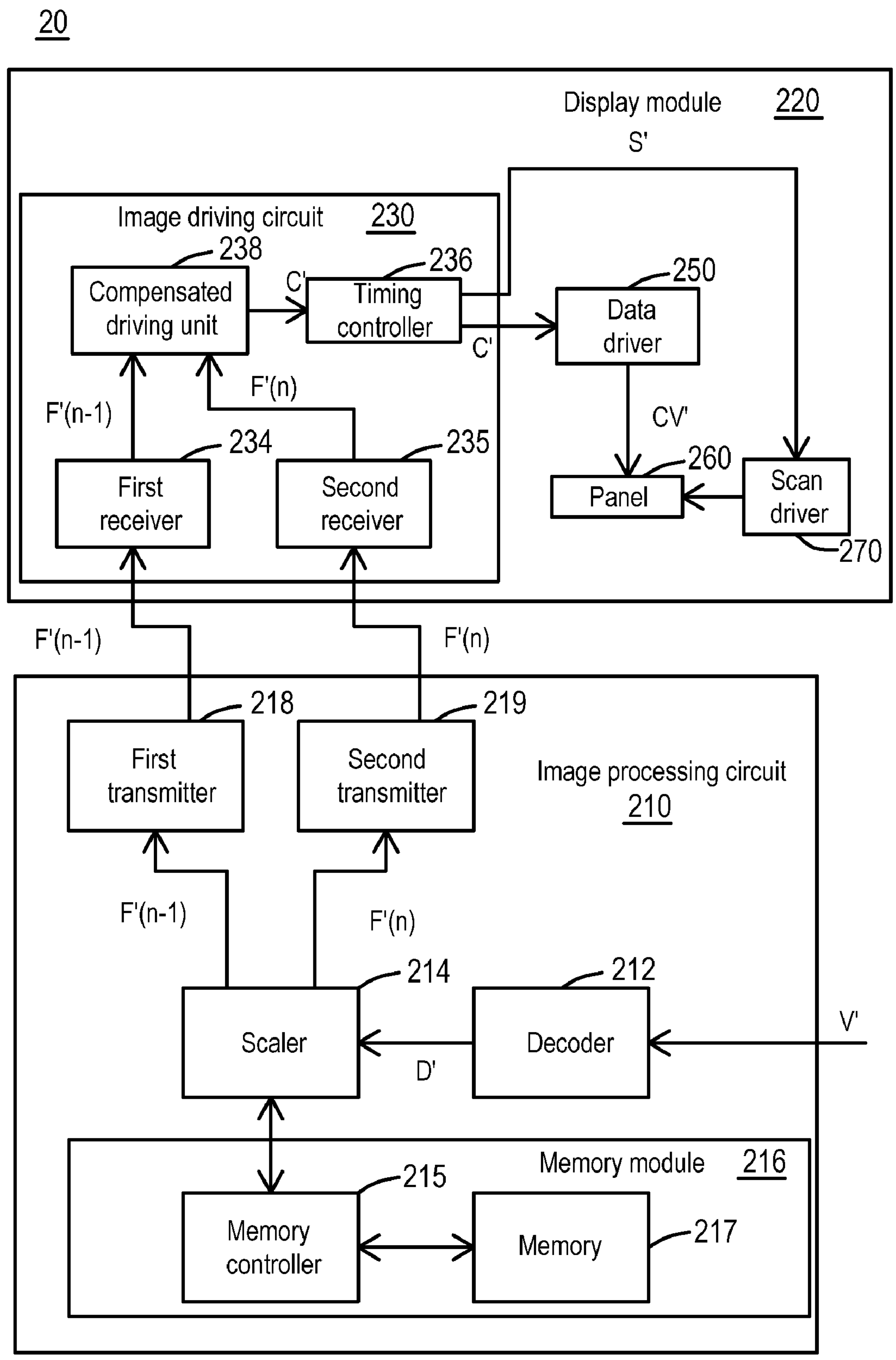
FIG. 2 is a block diagram schematically depicting a flat panel display according to a first embodiment of the invention.

FIG. 2 is a block diagram schematically depicting a flat panel display 20 according to a first embodiment of the invention. Referring to FIG. 2, the flat panel display 20 includes an image processing circuit 210 and a display module 220. The image processing circuit 210 receives an image signal V', and decodes the image signal V' into first image data and second image data for output. The first image data and the second image data in this embodiment are image data F'(n−1) of a $(n-1)^{th}$ frame and image data F'(n) of a $n^{th}$ frame. It is to be noted that the first image data outputted by the image processing circuit 210 in this embodiment corresponds to the whole frame, and the second image data also corresponds to the whole frame. Accordingly, the method of combining two sets of data, which are separately outputted, into one frame is not used in this embodiment.

The image processing circuit 210 includes a memory module 216, a decoder 212, a scaler 214, a first transmitter 218 and a second transmitter 219. The memory module 216 includes a memory 217 and a memory controller 215. The memory 217 may be, for example, a SDRAM (Synchronous Dynamic Random Access Memory). The memory controller 215 may be, for example, a SDRAM controller. The memory controller 215 controls the memory 217 to access image data of a previous frame and a current frame. The decoder 212 is electrically connected to the scaler 214 and the memory module 216 is electrically connected to the scaler 214. The scaler 214 is electrically connected to the first transmitter 218 and the second transmitter 219.

The display module 220 includes an image driving circuit 230, a data driver 250, a panel 260 and a scan driver 270. The panel 260 has multiple pixels, and the image data F'(n−1) of the $(n-1)^{th}$ frame and the image data F'(n) of the $n^{th}$ frame respectively correspond to each pixel on the panel 260.

The image driving circuit 230 receives the image data F'(n−1) of the $(n-1)^{th}$ frame and the image data F'(n) of the $n^{th}$ frame, and outputs pixel data and a control signal to drive the data driver 250 and the scan driver 270 according to the image data F'(n−1) of the $(n-1)^{th}$ frame an the image data F'(n) of the $n^{th}$ frame. The pixel data may be, for example, compensated driving data C', while the control signal may be, for example, a scan-starting signal S'.

The image driving circuit 230 includes a first receiver 234, a second receiver 235, a compensated driving unit 238 and a timing controller 236. The compensated driving unit 238 is electrically connected to the first receiver 234, the second receiver 235 and the timing controller 236. The timing controller 236 is electrically connected to the data driver 250 and the scan driver 270. The panel 260 is electrically connected to the data driver 250 and the scan driver 270.

A first channel is formed between the first receiver 234 of the display module 220 and the first transmitter 218 of the image processing circuit 210. A second channel is formed between the second receiver 235 of the display module 220 and the second transmitter 219 of the image processing circuit 210.

The data transfer interface of each of the first channel and the second channel may include various specifications. For example, the data transfer interface may be a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) or a TMDS (Transmission Minimized Differential Signaling) interface. The image processing circuit 210 transfers the previous frame and the current frame to the display module 220 through the above-mentioned data transfer interface.

In more detail, the decoder 212 receives the external image signal V' through the S terminal or AV terminal, decodes the external image signal V' into image data D', and transfers the image data D' to the scaler 214, which generates scaled image data according to the inputted image data D' and a resolution of the panel 260. When the scaler 214 generates the image data F'(n−1) of the $(n-1)^{th}$ frame according to the scaled image data, the memory controller 215 stores the image data F'(n−1) into the memory 217. Next, when the scaler 214 generates the image data F'(n) of the $n^{th}$ frame, the memory controller 215 stores the image data F'(n) into the memory 217 and reads out the image data F'(n−1) from the memory 217.

The scaler 214 transfers the image data F'(n) to the second receiver 235 through the second transmitter 219 and simultaneously transfers the image data F'(n−1) of the memory 217 to the first receiver 234 through the first transmitter 218.

The compensated driving unit 238 outputs the compensated driving data C' according to the pixel data F'(n−1) of the $(n-1)^{th}$ frame and the pixel data F'(n) of the $n^{th}$ frame. The timing controller 236 receives the compensated driving data C', and then outputs the compensated driving data C' to the data driver 250 and the scan-starting signal S' to the scan driver 270 according to timing. The data driver 250 outputs a driving voltage CV' to each pixel on the panel 260 according to the compensated driving data C'. The scan driver 270 sequentially turns on or off each pixel on the panel 260 according to the scan-starting signal S', to enable the panel 260 to display a frame.

The flat panel display 20 uses the first channel and the second channel between the image processing circuit 210 and the display module 220 to respectively transfer the image data of the previous frame and the current frame to the compensated driving unit 238. Thus, the compensated driving unit 238 compensates for the flat panel display 20 according to the image of the previous frame and the current frame. In addition, the number of the channels of the flat panel display 20 is not particularly restricted to that of the embodiment, and may be adjusted according to the requirement such that more channels may be formed in the flat panel display 20 to achieve a better imaging effect.

Figure 3:
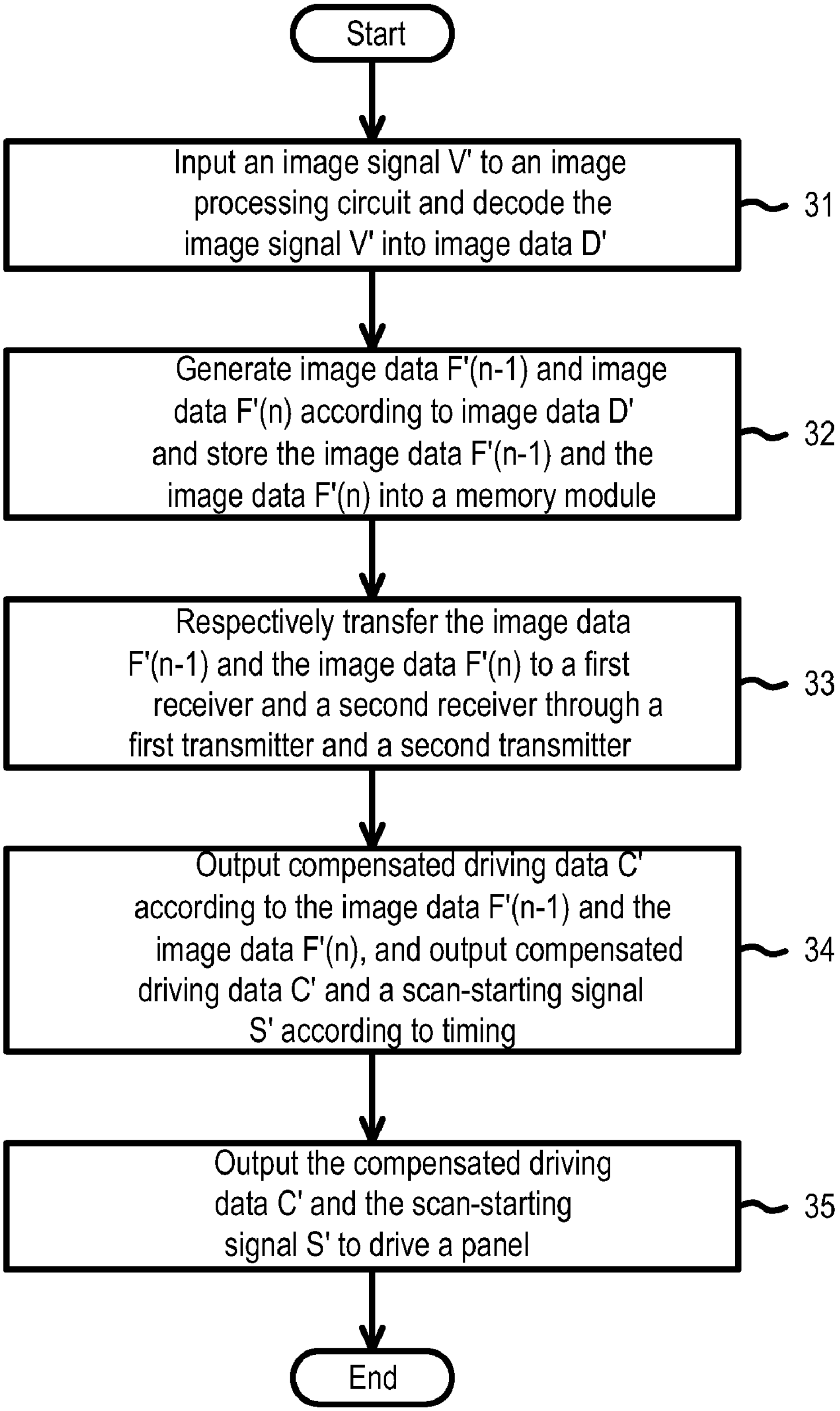
FIG. 3 is a flow chart outlining an image transfer method.

FIG. 3 is a flow chart illustrating an image transfer method used in the flat panel display 20. The image transfer method includes the following steps. First, step 31 inputs the image signal V' to the image processing circuit 210 and decodes the image signal V' into the image data D'. Next, step 32 generates the image data F'(n−1) and the image data F'(n) according to the image data D', and stores the image data F'(n−1) and the image data F'(n) into the memory module 216. Then, step 33 respectively transfers the image data F'(n−1) and the image data F'(n) to the first receiver 234 and the second receiver 235 through the first transmitter 218 and the second transmitter 219. Next, step 34 outputs the compensated driving data C' according to the image data F'(n−1) and the image data F'(n), and outputs the compensated driving data C' and the scan-starting signal S' according to timing. Finally, step 35 outputs the compensated driving data C' and the scan-starting signal S' to drive the panel 260.

Second Embodiment

Figure 4:
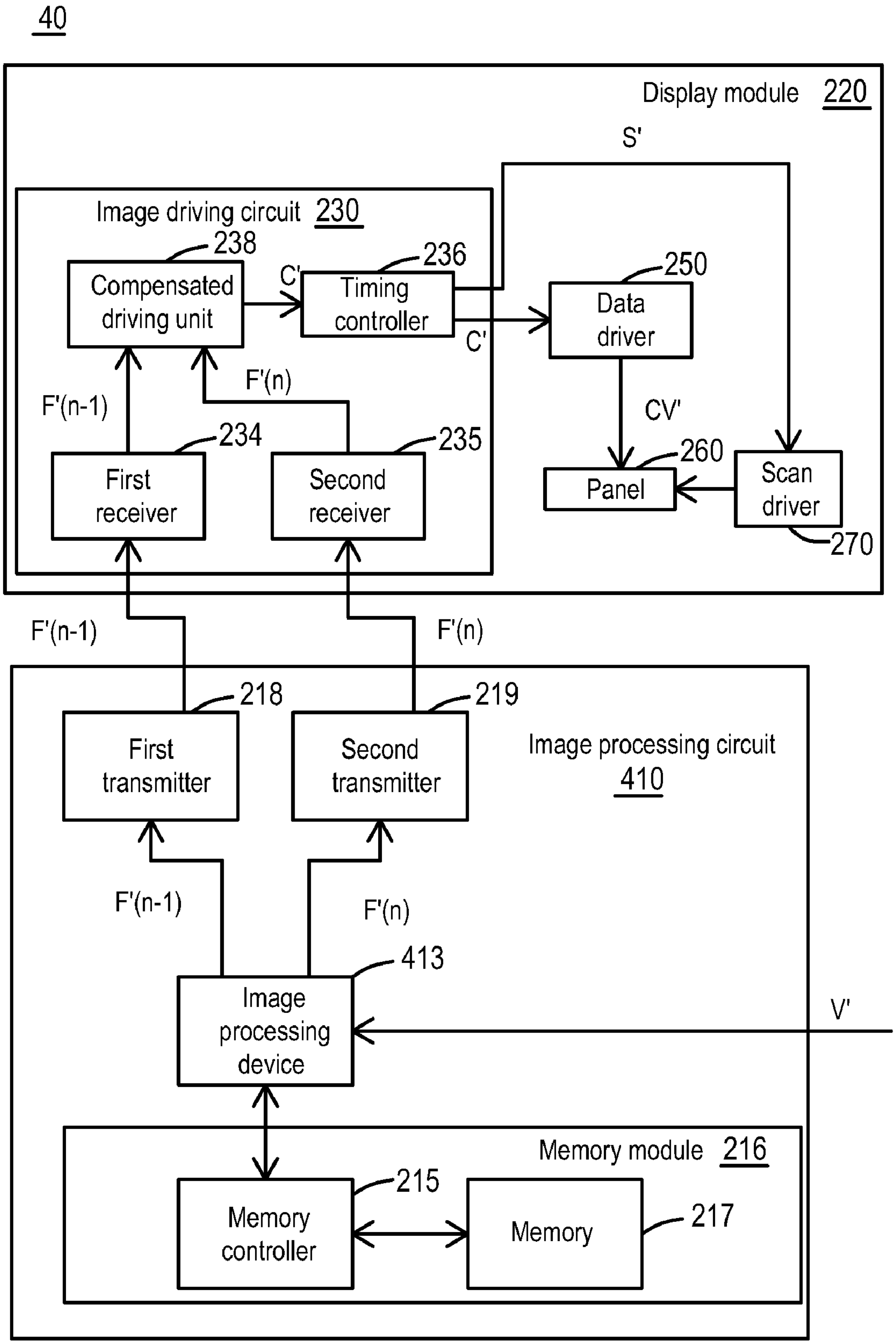
FIG. 4 is a block diagram schematically depicting a flat panel display according to a second embodiment of the invention.

FIG. 4 is a block diagram schematically depicting a flat panel display 40 according to a second embodiment of the invention. As shown in FIG. 4, the difference between the flat panel display 40 of this embodiment and the flat panel display 20 of the first embodiment is that an image processing device 413 of an image driving circuit 410 of the second embodiment is formed by integrating the scaler 214 and the decoder 212 of the first embodiment.

The image processing device 413 receives the external image signal V', processes the image signal V' according to various image processing methods, and then generates the image data F'(n−1) of the $(n-1)^{th}$ frame and the image data F'(n) of the $n^{th}$ frame.

The image data F'(n−1) and the image data F'(n) are outputted to the first receiver 234 and the second receiver 235 of the display module 220 through the first transmitter 218 and the second transmitter 219 such that the panel 260 may display frames.

In addition, the image processing device 413 may further integrate the memory module 216 to form an ASIC (Application Specific Integrate Circuit).

In the flat panel display having a multi-channel data transfer interface and the image transfer method, according to the embodiments of the invention, multiple channels are formed between the image processing circuit and the display module. Thus, no build-in memory and memory controller have to be disposed in the display module of the flat panel display, the printed circuit board in the display module may be reduced, the manufacturing cost may be effectively reduced, and the product competitiveness may be enhanced.

A second advantage of the invention is to reduce the size of the package casing of the image driving circuit. Because the image driving circuit of the image processing circuit does not need any build-in memory controller, the number of pins of the image driving circuit may be reduced, and the size of the package casing of the image driving circuit may be effectively reduced.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flat panel display, comprising:

an image processing circuit comprising:

a decoder for receiving an image signal and decoding the image signal into first complete frame image data and second complete frame image data;

a scaler for generating first adjusted image data and second adjusted image data according to the first complete frame image data and the second complete frame image data;

a memory module for storing the first adjusted image data and the second adjusted image data;

a first transmitter for transferring the first adjusted image data; and a second transmitter for transferring the second adjusted image data, wherein the scaler transfers the first adjusted image data and the second adjusted image data to the first transmitter and the second transmitter, respectively; and a display module distinctly separate from the image processing circuit, the display module comprising:

a panel;

a first receiver for receiving the first adjusted image data;

a second receiver for receiving the second adjusted image data;

a compensated driving unit for outputting compensated driving data according to the first adjusted image data and the second adjusted image data;

a timing controller for outputting the compensated driving data and a scan-starting signal according to timing;

a data driver for receiving the compensated driving data and thus outputting a driving voltage to the panel; and a scan driver for receiving the scan-starting signal to sequentially control each row of pixels on the panel;

wherein the display module does not include a memory module for storing image data.

2. The flat panel display according to claim 1, wherein the first transmitter and the second transmitter simultaneously transfer the first adjusted image data and the second adjusted image data, respectively.

3. The flat panel display according to claim 1, wherein the first receiver and the second receiver simultaneously receive the first adjusted image data and the second adjusted image data, respectively.

4. The flat panel display according to claim 1, further comprising a transfer interface between the first receiver and the first transmitter, the transfer interface comprising one of a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) and a TMDS (Transmission Minimized Differential Signaling) interface.

5. The flat panel display according to claim 1, further comprising a transfer interface between the second receiver and the second transmitter, the transfer interface comprising one of a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) and a TMDS (Transmission Minimized Differential Signaling) interface.

6. The flat panel display according to claim 1, wherein the memory module comprises:

a SDRAM (Synchronous Dynamic Random Access Memory); and a SDRAM controller for controlling the SDRAM to access the first adjusted image data and the second adjusted image data.

7. The flat panel display according to claim 1, wherein the decoder and the scaler are integrated into an image processing device.

8. A flat panel display, comprising:

an image processing circuit comprising:

a scaler; and first and second transmitters, wherein the scaler transfers first adjusted image data and second adjusted image data to the first transmitter and the second transmitter, respectively; and a display module distinctly separate from the image processing circuit, the display module comprising:

a panel having a plurality of pixels;

a first receiver for receiving first adjusted complete frame image data corresponding to the first adjusted image data;

a second receiver for receiving second adjusted complete frame image data corresponding to the second adjusted image data;

a compensated driving unit for outputting compensated driving data according to the first adjusted complete frame image data and the second adjusted complete frame image data;

a timing controller for receiving the compensated driving data and sequentially outputting the compensated driving data and a scan-starting signal;

a data driver for receiving the compensated driving data and thus outputting a driving voltage to the panel; and a scan driver for receiving the scan-starting signal to sequentially control the plurality of pixels on the panel, wherein the display module does not include a memory module for storing the first and second adjusted complete frame image data.

9. The display module according to claim 8, wherein the first receiver and the second receiver simultaneously receive the first adjusted image data and the second adjusted image data, respectively.

10. An image transfer method being used in a flat panel display, the flat panel display comprising an image processing circuit and a display module, wherein the image processing circuit comprises a scaler, a memory module and first and second transmitters, and wherein the display module comprises a panel and first and second receivers without a memory module for storing image data, the image transfer method comprising the steps of:

inputting an image signal to the image processing circuit, and decoding the image signal into first complete frame image data and second complete frame image data;

generating first adjusted image data and second adjusted image data according to the first complete frame image data and the second complete frame image data, and transferring the first adjusted image data and the second adjusted image data from the scaler to the first transmitter and the second transmitter, respectively, and storing the first adjusted image data and the second adjusted image data in the memory module;

transferring the first adjusted image data and the second adjusted image data to the first receiver and the second receiver through the first transmitter and the second transmitter, respectively;

outputting compensated driving data according to the first adjusted image data and the second adjusted image data, and outputting the compensated driving data and a scan-starting signal according to timing; and outputting the compensated driving data and the scan-starting signal to drive the panel.

11. The method according to claim 10, wherein the first adjusted image data between the first receiver and the first transmitter is transferred through one of a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) and a TMDS (Transmission Minimized Differential Signaling) interface.

12. The method according to claim 11, wherein the second adjusted image data between the second receiver and the second transmitter is transferred through one of a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) and a TMDS (Transmission Minimized Differential Signaling) interface.

13. The method according to claim 10, wherein the outputting of the compensated driving data and the scan-starting signal comprises:

receiving the compensated driving data and thus outputting a driving voltage to the panel; and receiving the scan-starting signal and thus sequentially controlling each row of pixels on the panel.

14. The method according to claim 10, wherein the memory module comprises:

a SDRAM (Synchronous Dynamic Random Access Memory); and a SDRAM controller for controlling the SDRAM to access the first adjusted image data and the second adjusted image data.

15. The method according to claim 10, wherein the first transmitter and the second transmitter simultaneously transfer the first adjusted image data and the second adjusted image data, respectively.

16. The method according to claim 10, wherein the first receiver and the second receiver simultaneously receive the first adjusted image data and the second adjusted image data, respectively.

17. A flat panel display, comprising:

an image processing circuit for receiving an image signal and decoding the image signal into first image data and second image data, the image processing circuit comprising:

a scaler; and first and second transmitters, wherein the scaler transfers first adjusted image data and second adjusted image data to the first transmitter and the second transmitter, respectively; and a display module distinctly separate from the image processing circuit, the display module comprising:

a panel having a plurality of pixels;

a data driver for transferring pixel data to the plurality of pixels;

a scan driver for switching the plurality of pixels; and an image driving circuit comprising first and second receivers for receiving the first image data corresponding to the first adjusted image data and the second image data corresponding to the second adjusted image data in parallel at the first receiver and the second receiver, respectively, and outputting the pixel data and a plurality of control signals to control the data driver and the scan driver according to the first image data and the second image data;

wherein the display module does not include a memory module for storing the first and second image data.

18. The flat panel display according to claim 17, wherein the first image data and the second image data respectively correspond to the plurality of pixels on the panel.

19. The flat panel display according to claim 17, wherein the image processing circuit further comprises a first transmitter and a second transmitter, the first transmitter and the second transmitter simultaneously transfer the first adjusted image data and the second adjusted image data, respectively.

20. The flat panel display according to claim 17, wherein the first receiver and the second receiver simultaneously receive the first adjusted image data and the second adjusted image data, respectively.

21. The flat panel display according to claim 17, further comprising a transfer interface, wherein the image processing circuit further comprises a first transmitter operatively connected with the first receiver, and wherein the transfer interface between the first receiver and the first transmitter comprises one of a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) and a TMDS (Transmission Minimized Differential Signaling) interface.

22. The flat panel display according to claim 17, further comprising a transfer interface, wherein the image processing circuit further comprises a second transmitter operatively connected with the second receiver, and wherein the transfer interface between the second receiver and the second transmitter comprises one of a LVDS (Low Voltage Differential Signaling) interface, a RSDS (Reduced Swing Differential Signaling) interface, a wide LVDS interface, a mini LVDS interface, a PPDS (Point-to-Point Differential Signaling) interface, a DVI (Digital Visual Interface) and a TMDS (Transmission Minimized Differential Signaling) interface.

23. The flat panel display according to claim 17, further comprising a memory module, wherein the memory module comprises:

a SDRAM (Synchronous Dynamic Random Memory Access, SDRAM); and a SDRAM controller for controlling the SDRAM to access the first adjusted image data and the second adjusted image data.

24. The flat panel display according to claim 17, further comprising a decoder, wherein the decoder and the scaler are integrated into an image processing device.

* * * * *